United States Patent [19]

Bose

[11] Patent Number: 4,754,878
[45] Date of Patent: Jul. 5, 1988

[54] CONTAINER FOR SHIPPING AND HANDLING FEATURE-LENGTH FILMS

[75] Inventor: Scott Bose, Racine, Wis.

[73] Assignee: S. Bose, Inc., Racine, Wis.

[21] Appl. No.: 55,539

[22] Filed: May 29, 1987

[51] Int. Cl.[4] .......................................... B65D 85/672
[52] U.S. Cl. ...................................... 206/398; 206/53;
206/408; 242/71.8; 242/72 R
[58] Field of Search ................ 206/53, 398, 402, 403,
206/404, 303, 408; 242/71.8, 72 R, 115

[56] References Cited

U.S. PATENT DOCUMENTS

| 1,941,034 | 12/1933 | Lange | 206/402 |
|---|---|---|---|
| 2,106,726 | 2/1938 | Draeger | 206/398 |
| 2,335,766 | 11/1943 | Kinloch | 206/403 |
| 2,889,921 | 6/1959 | Hubbard | 206/408 |
| 3,002,610 | 10/1961 | Granger | 206/398 |
| 3,132,822 | 5/1964 | Arthur | 242/71.8 |
| 3,169,682 | 2/1965 | Hollingsworh | 206/404 |
| 3,231,081 | 1/1966 | Elterman | 206/398 |
| 3,307,688 | 3/1967 | Widmont, Jr. | 206/406 |
| 3,389,872 | 6/1968 | Lyman | 242/71.8 |
| 3,451,541 | 6/1969 | Posso | 206/406 |
| 3,452,879 | 7/1969 | Guarino | 206/402 |
| 3,554,462 | 1/1971 | Bundschuh | 206/404 |
| 3,620,475 | 11/1971 | Penn | 206/404 |
| 3,661,337 | 5/1972 | Burth | 242/55.19 R |
| 3,744,828 | 7/1973 | Goldberg | 206/404 |
| 3,780,959 | 12/1973 | Burth | 242/55.18 |
| 3,820,738 | 6/1974 | Collins | 206/403 |
| 4,101,030 | 7/1978 | Kroeber | 206/398 |
| 4,169,566 | 10/1979 | Boudouris et al. | 242/55.18 |
| 4,349,166 | 9/1982 | Tanaka et al. | 206/398 |
| 4,473,194 | 9/1984 | Kashimura | 242/71.8 |
| 4,702,429 | 10/1987 | Black | 242/71.8 |

FOREIGN PATENT DOCUMENTS

| 174859 | 10/1952 | Austria | 206/398 |
|---|---|---|---|
| 1065949 | 5/1954 | France . | |
| 831747 | 3/1960 | United Kingdom | 206/402 |

Primary Examiner—David T. Fidei
Attorney, Agent, or Firm—Peter N. Jansson, Ltd.

[57] ABSTRACT

A container for shipping and handling a motion picture film of feature length ready for projection using turntable-type projection equipment without the need for splicing or cutting the film. The device has spaced upper and lower main walls with central openings, an inner ring between the main walls removably secured to the lower wall and providing for film attachment, an outer annular wall extending between the main walls near the peripheral edges and preferably an inner annular wall near the central openings, and devices drawing the main walls together to close the container. Preferred embodiments have the outer and inner annular walls affixed to the upper wall such that the lower main wall forms a substantially flat disk without substantial projections, to facilitate film removal and rewinding during first and last showings of the film at a theater. Other features relate to inner ring characteristics aiding attachment and removal.

19 Claims, 2 Drawing Sheets

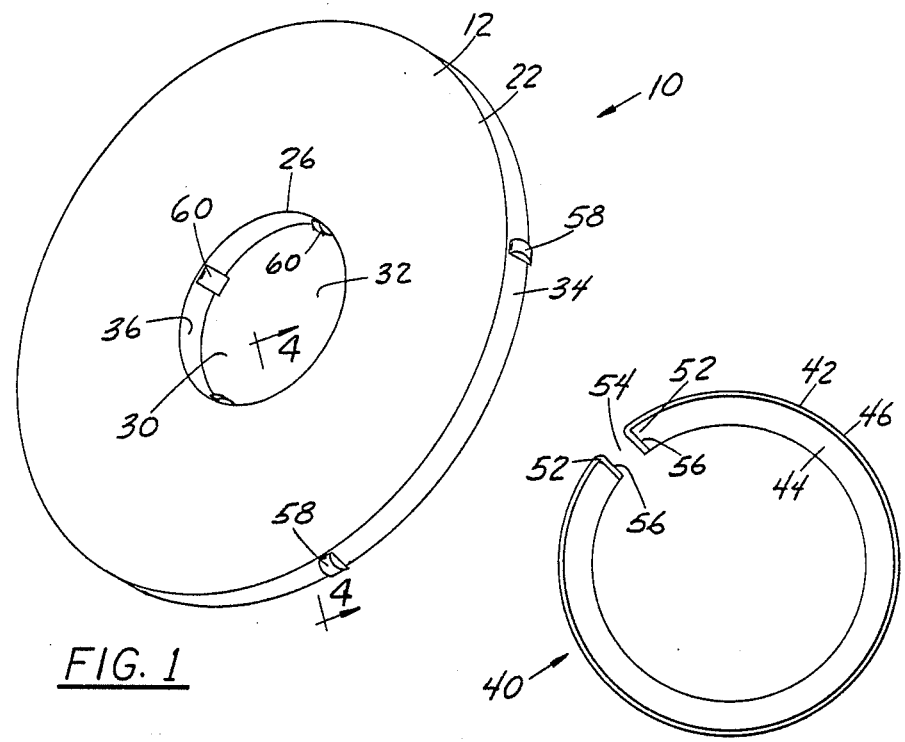
FIG. 1
FIG. 3
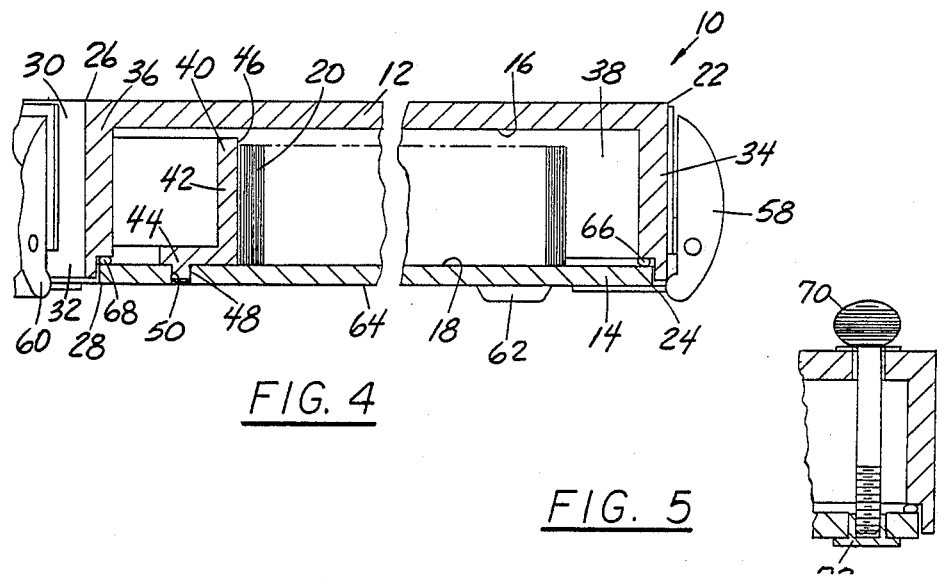
FIG. 4
FIG. 5

CONTAINER FOR SHIPPING AND HANDLING FEATURE-LENGTH FILMS

FIELD OF THE INVENTION

This invention is related generally to shipping and handling of motion picture films by movie theaters such as commercial theaters and, more particularly, to containers for shipping and handling feature-length motion picture films.

BACKGROUND OF THE INVENTION

Modern film-handling and projection facilities in commercial movie theaters have for many years utilized turntable-type projection equipment. Some examples of such well-known film handling equipment are disclosed in U.S. Pat. Nos. 3,661,337, 3,780,959, 3,823,890 and 4,169,566. In using such equipment to move a film to and from the projector, a coiled motion picture film rests on a round horizontal flat table and is unwound from the center of the coil upon turning of the turntable. Then, after running through the projector, the film is taken up on another similar turntable.

In preparing feature-length motion picture films for projection using such equipment, several individually coiled film segments, which are shipped to the theater in a box containing several reels, are spliced together usually using special "set-up" equipment. Once these several film segments are spliced together, the entire film is wound onto an inner ring which is removably attached to the upper surface of one of the turntables. Such turntable becomes the turntable from which the film is fed to the projector during the first run of the film at the theater.

As is typical in the commercial movie theater industry, a film may be shown several times over a course of several days before it is scheduled for shipment to another theater or return to a commercial film library. After the last showing, it is necessary to cut the feature-length film into several segments and rewind it onto several reels. The reels are then inserted in a box for shipment.

The process of repetitive splicing and cutting of feature-length motion picture films causes many problems, for a number of reasons.

One very obvious problem is that set-up and break-down operations are very time-consuming and costly. Such operations are often carried out by unskilled theater personnel which increases the problems associated with set-up and break-down. Any time a film is spliced together or cut there are possibilities for error and unnecessary film damage.

Of not insignificant concern is that, as would be expected, minor segments of the artistic content are removed such that over a long period of time the quality of the film is noticeably degraded. In point of fact, it can be seen that this common manner of handling major motion pictures in effect places the artistic content of the film in the hands of those who should have no responsibility for it.

Furthermore, the practice of repetitively splicing and cutting, setting up and breaking down, major motion picture films greatly increases the exposure of such films to dirt, nicks, scratching, creasing, finger marks and the like. Given that the process is repeated over and over, the integrity and useful life of films are threatened.

There has been a long-standing need for an improved system and means for handling and shipping motion picture film. In particular, there is a need for a container for shipping and handling feature-length motion picture films in condition ready for projection using turntable-type projection equipment of the type widely used in commercial theaters.

OBJECTS OF THE INVENTION

It is an object of this invention to provide a system for shipping and handling a feature-length motion picture film overcoming some of the problems and shortcomings of the prior art.

Another object of this invention is to provide an improved system for shipping and handling feature-length films in condition ready for projection using turntable-type equipment of the type commonly used in projection operations in commercial theaters.

Another object of this invention is to provide an improved container for shipping and handling a motion picture film eliminating the need for splicing and cutting of such film.

Another object of this invention is to provide a system for shipping and handling motion picture films which greatly reduces the time necessary for preparation of a feature-length film for showing and greatly reduces the time for preparation for shipment.

Another object of this invention is to provide an improved container for shipping and handling of feature-length films which protects the artistic content and integrity of the film.

Another object of this invention is to provide an improved container for shipping and handling of feature-length films which reduces the exposure of a film to dirt and other things deleterious to film.

These and other important objects will be apparent from the descriptions of this invention which follow.

SUMMARY OF THE INVENTION

This invention is an improved container useful in shipping and handling of a feature-length motion picture film. The invention overcomes certain well-known problems including those mentioned above. More specifically, the container of this invention allows feature-length films to be shipped and handled at theaters without any splicing or cutting of the film. The film arrives at a theater ready for projection using the turntable-type projection equipment which is commonly used by theaters.

The improved container of this invention includes: upper and lower main walls having inside surfaces with a spacing therebetween greater than the width of the film, peripheral edges, and inner edges defining central openings; an outer annular wall extending between the main walls near the peripheral edges; an inner ring, which provides means for film attachment, between the main walls and removably secured to the lower main wall; and means for drawing the main walls toward each other to hold the container closed.

In preferred embodiments, the container also includes an inner annular wall extending between the main walls near the inner edges. Such inner wall is spaced radially inwardly from the inner ring. The inner wall and the inner ring are preferably substantially concentric, as are the inner wall and the outer wall.

In highly preferred embodiments, the annular walls are affixed to the upper main wall while the lower main wall forms a flat disk without substantial projections from its inside surface. This facilitates removal of film from the lower main wall during the first showing of the film at a theater and rewinding of the film onto the inner ring and lower main wall during the last showing of the film at a theater.

The outer annular wall preferably is aligned with the peripheral edges of both main walls. The inner annular wall preferably is aligned with the inner edges on both main walls.

In certain highly preferred embodiments, the inner ring has means facilitating its removal from the lower main wall and from coiled film wrapped tightly around it, as is necessary just prior to the first showing of the film at a theater. Such means to facilitate removal preferably involves the inner ring having a variable outer diameter such that reducing its diameter allows the ring to be lifted from the coiled film and removed from the lower main wall.

Most preferably, the inner ring has a pair of opposed ends which define a variable gap in the ring and means for squeezing the ends toward each other to reduce the outer diameter of the ring. Preferably, a pair of radially inwardly extending tabs are at the opposed ring ends, adjacent to the gap in the ring. Projectionists and film handlers at theaters would be familiar with this type of ring because rings of this general type are used on turntable-type projection equipment.

The inner ring and the lower main wall preferably have interengaging means such as mating male and female means. More specifically, the mating male and female means include posts extending from the lower surface of the inner ring and recesses in the lower main wall receiving the posts.

The dimensioning of the inner ring and the posts and the spacing between the main walls are such that when the ring and the lower main wall are engaged in the closed container, the inner ring is so closely adjacent to the inside surface of the upper main wall that the upper main wall prevents the inner ring from disengaging from the lower main wall as long as the container is closed.

The upper and lower main walls preferably are held in the proper closed spacing by a plurality of holders, such as clasps, clips, or bolts, spaced around the peripheral edges. The container preferably also includes a plurality of similar holders spaced around the inner edges.

Seals are preferably included to make the container substantially water-tight. This helps to protect the film during shipment and storage. Annular seals are preferably located between each of the annular walls and the lower main wall. When the main walls are drawn together to close the container, pressure is applied to these seals to provide water-tight closure.

As already noted, the film shipping and handling container of this invention makes the handling and shipping of feature-length films by theaters much easier than it has been. And it eliminates the damage that repeated splicings and cuttings do to valuable film. The container of this invention holds an entire feature-length film in a single winding around the inner ring, previously described, and at no time is it necessary to cut or splice.

When a film arrives in its container for a multi-showing run at a theater, the container is placed on one of the turntables in the projection room, with its lower main wall on the turntable. The openings in the main walls accommodate the apparatus located in the middle of the turntable which is used for guiding the film off and onto the table.

The clamps, clasps, or other means used to hold the container closed are removed and the upper main wall is removed. The inner and outer annular walls, which are preferably attached to the upper main wall, are removed with it. This leaves the lower main wall, the inner ring, and the feature film resting on the turntable.

The inner ring is then removed by squeezing its tabs together to reduce its diameter. This allows easy removal of the inner ring from the film and from the lower main wall. The end of the film which had been against the inner ring is then threaded in the normal manner to and through the projection equipment and back onto a take-up turntable. The film is shown in the normal manner, the only difference being that as it is shown it is removed from the lower wall which rests on the turntable.

After the first showing of the film, the lower main wall is removed from the turntable. Succeeding showings of the film are done in the normal manner, running from one turntable to another with no part of the container of this invention needed. The upper main wall and its attached inner and outer annular walls together can serve as a convenient dust cover when the film is resting on a turntable and not in use.

Just prior to the last showing of the feature film at the theater, the lower main wall is placed on the take-up turntable (whichever turntable that might be) and the inner ring is then secured to the lower main wall such as by insertion of the preferred posts into recesses in the lower main wall. The lead end of the film is attached to the inner ring and the inner ring is used as a winding hub for the entire feature film during its last showing at the theater.

Then the upper main wall, preferably with its attached outer and inner annular walls, is placed over the lower main wall with the inner ring and the film in place. The edge clasps or other means to hold the container together are locked in place to make the container and film ready for shipment. The same operations are used at each theater, and splicing and cutting of the feature film is not necessary.

The openings in the main walls of the container are preferably aligned and of sufficient size such that a human arm can extend through the container. This allows particularly easy carrying of the feature film and its container.

BRIEF DESCRIPTION OF THE DRAWINGS

FIG. 1 is a perspective view of a preferred container for shipping and handling of feature-length motion picture films in accordance with this invention.

FIG. 3 is an enlarged top plan view of the inner ring, one of the parts shown in FIG. 2.

FIG. 4 is an enlarged fragmentary sectional view taken along section 4—4 as indicated in FIG. 1.

FIG. 5 is a similar sectional view showing a portion of a container as in FIG. 4, but illustrating an alternate device for holding the container together.

DETAILED DESCRIPTIONS OF PREFERRED EMBODIMETNS

Figure 2:
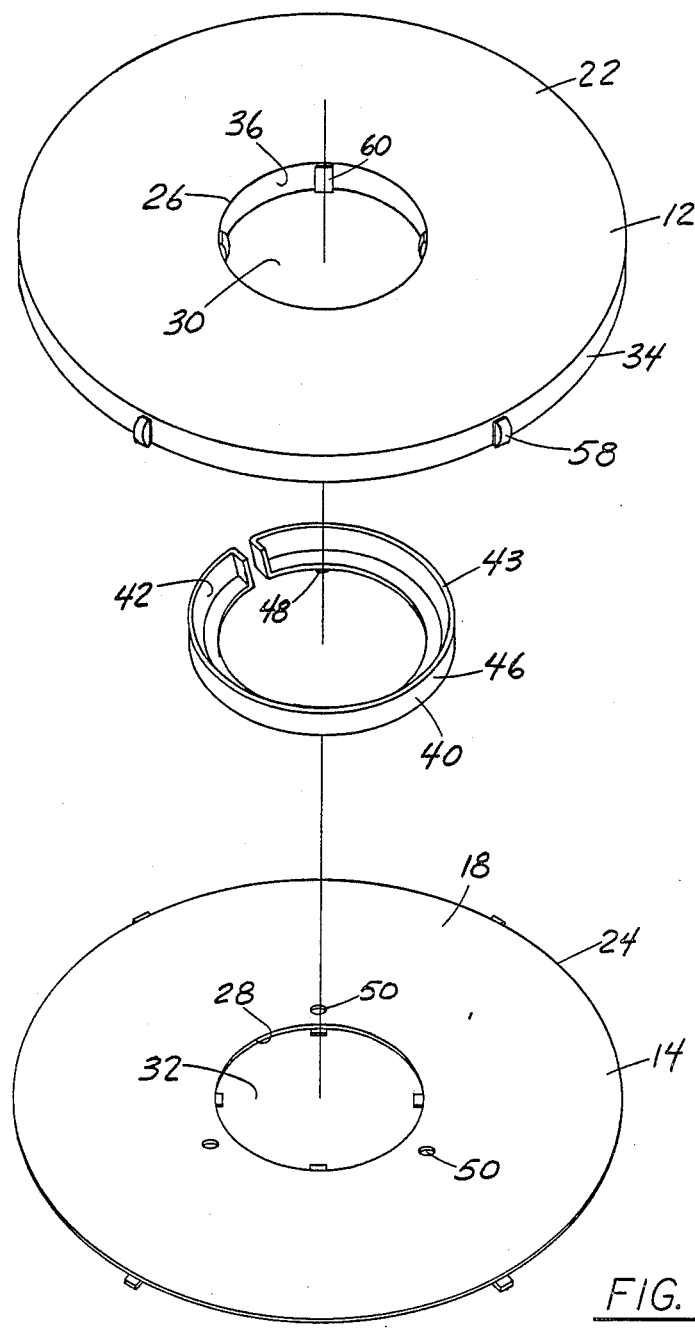
FIG. 2 is an exploded perspective view.

The drawings illustrate a container 10 which is a preferred embodiment of this invention. Container 10 is used for shipping and handling a motion picture film, particularly a feature-length film, in condition ready for projection using turntable-type projection equipment of the type commonly used in commercial motion picture theaters.

Container 10 has an upper main wall 12 and a lower main wall 14. Upper and lower main walls 12 and 14 have upper and lower inside surfaces 16 and 18, respectively. When container 10 is closed, inside surfaces 16 and 18 are supported with a set spacing between them which is greater than the width of a contained film 20.

Main walls 12 and 14 have peripheral edges 22 and 24, respectively. Main walls 12 and 14 also have inner edges 26 and 28, respectively, which define upper and lower central openings 30 and 32. Affixed to, preferably integrally formed with, upper main wall 12 are an annular outer wall 34 and an annular inner wall 36.

Annular walls 34 and 36, when container 10 is closed, extend between main walls 12 and 14 and serve to set the spacing between inside surfaces 16 and 18. Outer annular wall 34 is aligned with peripheral edges 22 and 24 and inner annular wall 36 is aligned with inner edges 26 and 28.

As shown best in FIG. 4, the lower ends of annular walls 34 and 36 are formed with ledges positioned and dimensioned to engage peripheral edge 24 and inner edge 28 of lower main wall 12, respectively. Resilient annular seals 66 and 68 are permanently affixed against such ledges to be engaged between lower main wall 14 and annular walls 34 and 36, respectively. This serves to prevent moisture from entering container 10 during shipment and storage.

With annular walls 34 and 36 depending from upper main wall 12, lower main wall 14 forms a substantially flat planar disk with no significant projections extending from it. This configuration is particularly helpful in facilitating removal of film 20 from lower main wall 14 during the first showing of the film at a theater, and in rewinding of film 20 onto lower main wall 14 during the last showing of the film.

Main walls 12 and 14 and annular walls 34 and 36 together form an annular space 38 of substantial dimension within container 10. The diameter of container 10, for example, may be over 36 inches, preferably on the order of 42 inches, to accommodate a feature-length film.

Located within annular space 38, between main walls 12 and 14, is an inner ring 40. Inner ring 40 has an L-shaped cross-sectional configuration, as shown in FIG. 4, including an upright portion 42, which terminates in a ring top surface 43, and a flat lower portion 44. Upright portion 42 of inner ring 40 has an outward wall 46 which provides a winding surface for film 20.

Inner ring 40 extends along a circle which is concentric with outer wall 34 and inner wall 36. Inner annular wall 36 is spaced radially inwardly from inner ring 40 and closely adjacent to it. Outer annular wall 34 is spaced radially outwardly from inner ring 40 by a substantial distance to accommodate a coiled motion picture film 20 of feature length.

Three posts 48, which are substantially equally spaced along inner ring 40, project from the lower surface of flat lower portion 44 in a direction perpendicular to lower main wall 14. Posts 48 are received in recesses 50 in inside surface 18 of lower main wall 14 such that posts 48 and recesses 50 provide male-female means for removably securing inner ring 40 to lower main wall 14. Such interengagement means are highly preferred, but other means would be acceptable.

When container 10 is closed, with inner ring 40 secured in place, top surface 43 of inner ring 40 is immediately adjacent to inside surface 16 of upper main wall 12. Such spacing and the lengths of posts 48 are such that upper main wall 12 prevents disengagement of posts 48 from recesses 50 as long as container 10 is closed. With upper main wall 12 removed, inner ring 40 may be removed from lower main wall 14.

Outward wall 46 of inner ring 40 has a variable diameter. Inner ring 40 has a pair of opposed ends 52 defining a variable gap 54 in inner ring 40. The material and dimensioning of inner ring 40 are such that inner ring 40 may be squeezed slightly to lessen the diameter of outward wall 46. Such squeezing is facilitated by tabs 56 which extend radially inwardly from inner ring 40 at opposed ends 52. By grasping the tabs 56 simultaneously and squeezing and lifting, inner ring 40 may easily be lifted from coiled film 20 and removed from lower main wall 14.

Gap 54, in addition to facilitating removal of inner ring 40 from the film, provides a means for attachment of film 20 to inner ring 40 in preparation for rewinding. After inserting the lead end of the film through gap 54 and turning once or twice, the film wraps around itself to hold it on inner ring 40 as is well-known in the art.

Four edge clasps 58, which may be tension catches or any other suitable holding devices, are spaced about around peripheral edges 22 and 24 and serve to draw and hold main walls 12 and 14 together in their proper closed spacing. Likewise, additional edge clasps 60 are spaced about inner edges 26 and 28 and serve the same purpose.

As illustrated in FIG. 4, rubber nubs 62 affixed on the lower surface 64 of lower main wall 14 support container 10, or its lower main wall 14, on a turntable. Nubs 62 and the weight of lower main wall 14 or container 12, with or without film 20, are sufficient to keep them from sliding to an improper position on the turntable. Openings 30 and 32 in main walls 12 and 14 receive certain turntable center structure (not shown) which is used in guiding film 20 from the turntable or back onto the turntable.

Container 10 is used in the following manner:

When container 10 arrives at a theater, it contains a feature-length motion picture film 20 ready to be shown without the need for splicing to join various segments of the feature film as heretofore has been necessary.

First, container 10 is placed on a turntable of the projection equipment used at such theater with lower main wall 14 resting on the turntable surface. Next, edge clasps 58 and 60 are removed and upper main wall 12, with depending annular walls 34 and 36, is lifted away from the turntable and placed to the side. This leaves lower main wall 14 and inner ring 40 with feature film 20 resting on the turntable.

Inner ring 40 is then removed by squeezing tabs 56 as previously described. The lead end of film 20, taken from the inside of the coil, is threaded in the normal manner to and through the projection equipment and back onto a take-up turntable. After the first showing of film 20 serves to unload film 20 from lower main wall 14, lower main wall 14 is removed from the turntable and no part of container 10 is needed until later, just prior to the last showing of feature film 20.

Just prior to such last showing, lower main wall 14 is placed on the take-up turntable and inner ring 40 is secured to lower main wall 14 by insertion of posts 48 in recesses 50, as previously described. The lead end of film 20 is attached to inner ring 40 in the manner previously described. Film 20 winds onto inner ring 40 and lower main wall 14 during the last showing.

Then, upper main wall 12, with the depending annular walls 34 and 36, is placed over lower main wall 14 with inner ring 40 remaining in place. Attachment of edge clasps 58 and 60 closes container 10 making it ready for shipment. There is no need for any splicing or cutting of feature film 20 during this entire operation.

FIG. 5 illustrates one alternative to clasps 58 and 60. A thumb bolt 70 extends through upper main wall 12 near peripheral edge 22 and is engaged with a threaded receptacle 72 affixed to lower main wall 14.

Container 10 may be made using a wide variety of materials. Tough engineering plastics of substantial thickness are highly preferred for main walls 12 and 14, annular walls 34 and 36, and inner ring 40. A preferred material is high-density polyethylene, which is preferably used in thicknesses of about one-quarter inch. Other plastics which are rigid and have high-impact strength are acceptable, one example being polyvinyl chloride.

Acceptable material choices for these parts and for other parts of the invention would be apparent to those skilled in the art who are made aware of this invention.

While the principles of this invention have been described in connection with specific embodiments, it should be understood clearly that these descriptions are made only by way of example and are not intended to limit the scope of the invention.

What is claimed:

1. In a motion picture film shipment/handling container of the type including an enclosure and film therein, the improvement comprising:
    upper and lower main walls having inside surfaces with a spacing therebetween greater than the film width, peripheral edges, and inner edges defining central openings;
    an outer annular wall extending between the main walls near the peripheral edges;
    an inner ring between the main walls and removably secured to the lower main wall along the inner edge thereof, the inner ring: defining a central void; having means facilitating its removal from the lower main wall and from coiled film wrapped tightly around it and further having means for film attachment; and terminating radially outwardly near the inner edge of the lower main wall such that said film wound thereon rests directly on the lower main wall; and
    means for drawing the main walls together to said spacing thereby to close the container,
whereby feature-length films may be shipped in condition ready for projection using turntable-type projection equipment and handled at theaters without splicing or cutting of film.

2. The container of claim 1 wherein:
    the outer annular wall is affixed to the upper main wall; and
    the lower main wall forms a substantially flat disk without substantial projections from its inside surface,
thereby facilitating removal from and rewinding onto the lower main wall during the first and last showings of the film at a theater.

3. The container of claim 1 wherein the inner ring has means facilitating its removal from the lower main wall and from coiled film wrapped tightly around it.

4. The container of claim 3 wherein the means to facilitate removal comprises the inner ring having a variable outer diameter whereby reducing its diameter allows the ring to be lifted from the coiled film and removed from the lower main wall.

5. The container of claim 4 wherein the inner ring comprises:
    a pair of opposed ends defining a variable gap in the ring; and
    means for squeezing the ends toward each other to reduce the ring diameter.

6. The container of claim 1 further including an inner annular wall extending between the main walls near the inner edges, the inner wall spaced radially inwardly from the inner ring.

7. The container of claim 6 wherein the inner wall and the inner ring are substantially concentric.

8. The container of claim 7 wherein the inner wall and the outer wall are substantially concentric.

9. The container of claim 6 wherein:
    the inner and outer annular walls are affixed to the upper main wall; and
    the lower main wall forms a substantially flat disk without substantial projections from its inside surface,
thereby facilitating removal from and rewinding onto the lower main wall during the first and last showings of the film at a theater.

10. The container of claim 9 wherein the inner wall, outer wall and inner ring are substantially concentric.

11. The container of claim 1 wherein the inner ring and the lower main wall have interengaging means.

12. The container of claim 11 wherein the interengaging means are mating male and female means.

13. The container of claim 12 wherein the mating male and female means comprise posts extending from the inner ring and recesses in the lower main wall receiving the posts.

14. The container of claim 13 wherein the inner ring, when secured to the lower main wall in the closed container, extends from the lower main wall to immediately adjacent to the inside surface of the upper main wall such that the upper main wall prevents disengagement of the interengaging means as long as the container is closed.

15. The container of claim 1 wherein the means to draw the main walls comprises a plurality of holders spaced around the peripheral edges.

16. The container of claim 14 further including a plurality of holders spaced around the inner edges.

17. The container of claim 15 further comprising annular seals between the annular walls and the lower main wall thereby to prevent moisture from entering the container.

18. The container of claim 1 wherein the outer annular wall is aligned with the peripheral edges of both main walls and the inner ring is aligned with the inner edges of both main walls.

19. A container for shipping and handling a motion picture film in condition ready for projection using turntable-type projection equipment comprising:
    upper and lower main walls having inside surfaces with a spacing therebetween greater than the film width, peripheral edges, and inner edges defining central openings;
    an outer annular wall extending between the main walls near the peripheral edges;
    an inner ring between the main walls and removably secured to the lower main wall, the inner ring having: means for film attachment, a pair of opposed ends defining a variable gap in the ring, and radially inwardly extending tabs at the opposed ends whereby the ends may be squeezed toward each other to reduce the ring diameter and thus facilitate lifting and removal of the ring from the lower main wall and from film wrapped tightly around said ring; and means for drawing the main walls together to said spacing thereby to close the container, whereby feature-length films may be shipped and handled at theaters without splicing or cutting of film.

* * * * *